United States Patent Office.

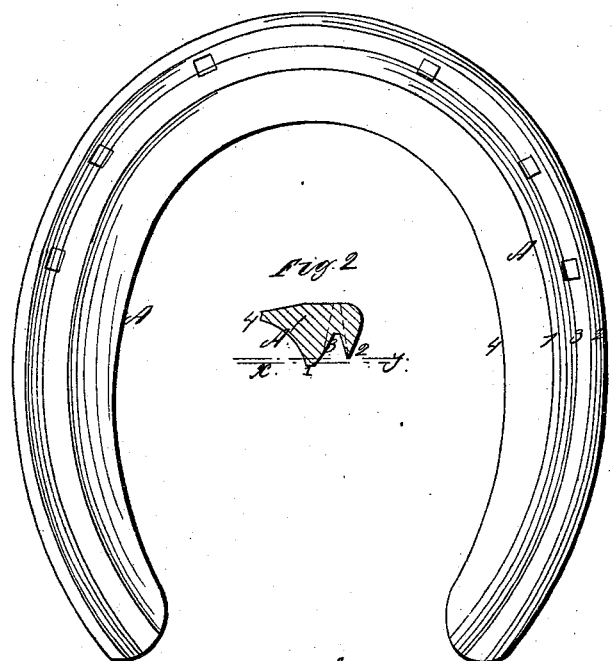
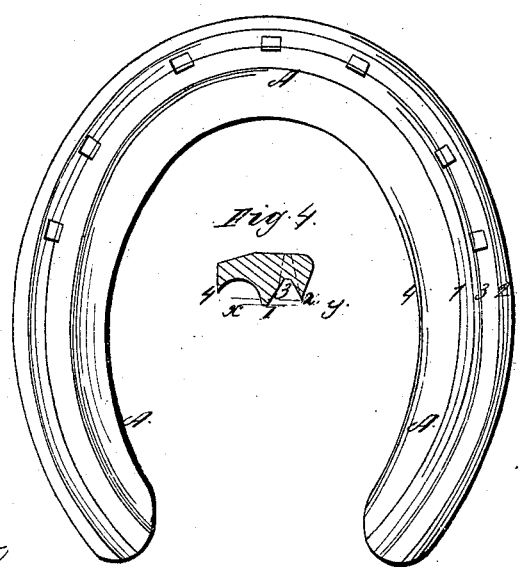

PATRICK MURRAY, OF EAST MORRISANIA, NEW YORK.

Letters Patent No. 76,501, dated April 7, 1868.

IMPROVEMENT IN HORSE-SHOES.

The Schedule referred to in these Letters Patent and making part of the same.

TO ALL WHOM IT MAY CONCERN:

Be it known that I, PATRICK MURRAY, of East Morrisania, in the county of Westchester, and State of New York, have invented certain new and useful Improvements in Horse-Shoes; and I do hereby declare the following to be a full, clear, and exact description of the same, reference being had to the accompanying drawings, making a part of this specification, in which—

Figure 1 represents a view of the bottom or treading-surface of one of my horse-shoes, and Figure 2 represents a cross-section through the shoe.

Figure 3 represents a modified form of shoe, and

Figure 4 a cross-section through the same.

I am aware that a double continuous calk has been used on horse-shoes, which calks or bearing-edges were of uniform height, so that the horse in standing upon the shoe was supported upon both of these calks or edges. The consequence of such a construction is, that both calks taking uniform weight and wear, neither of them is in condition to prevent the foot from slipping, as there are two points of support, and neither one prominent enough to act as a calk. I am also aware that in another form of shoe there has been what is called a continuous calk inside of the swedged groove that the nail-heads occupy, and outside of said groove a flange or projection, which formed no support, at any time or under any circumstances, to the foot of the horse. Neither of these shoes involves the object or purpose of my invention, and I lay no claim to any such shoes.

My invention consists in having two calks clear around the shoe, or nearly so—one outside of and the other inside of the row of nails; the inner calk to take the main support of the foot of the horse, and having more surface area for that purpose, and the outer calk less prominent than the inner one, and sharper, or of less surface area than the inner one, and which shall only come into action after the inner calk becomes slightly embedded, or when the inclination of the horse's foot in travelling or drawing brings that part of the shoe in contact with the surface travelled over or upon.

To enable others skilled in the art to make and use my invention, I will proceed to describe the same with reference to the drawings.

A B, figs. 1 and 3, represent the bottom or tread portion of two full-sized shoes made after my plan. The bars for these shoes are rolled out to the proper form, shape, or sectional area by suitable rollers made for the purpose, and I prefer to make the shoes of steel entirely. In these shoes 1 represents the inner or main supporting calk, 2 represents the outer auxiliary calk, and 3 represents the groove between them for the reception of the nail-heads. The difference between the prominence of the calks 1 and 2 is shown by the red lines $xy$. The calk 1 has more bearing-surface than the other; it takes the main portion of the wear, and is nearer the centre of the shoe, taking the weight off from the rim of the hoof. After the calk 1 has embedded itself to the extent of the distance between the lines $xy$, or, when the leg and hoof of the horse are inclined, as in the act of travelling or drawing, and when it is in the position where it is most apt to slip, then the sharper protected calk, 2, takes hold, and gives to the foot of the animal a firm and holding support. If the calk 2 were in constant use, its sharper edge, and efficiency in holding it, would be impaired, whereas, receding it slightly, it is shielded by the other more prominent calk, and is most efficient when the foot of the horse is in the position where it is most liable to slip, or where it most needs support against slipping.

From the inner calk, 1, to the inner edge of the shoe at 4, the curvature may be either like that in fig. 1, or in fig. 2, the former being less inclined to hold any material in it, as snow in "balling," or a stone.

Having thus fully described my invention, and shown in what particulars it differs from other things for a similar purpose, what I claim therein as new, and desire to secure by Letters Patent, is—

A steel horse-shoe, with two continuous, or nearly so, calks 1 and 2, the former more prominent or projecting, and with more bearing-surface than the latter, so as to take the main support and wear, whilst the latter continues sharp and efficient as an auxiliary calk to prevent slipping, substantially in the manner described.

PATRICK MURRAY.

Witnesses:
SILAS D. GIFFORD,
JOHN A. HENRY.